(12) United States Patent
Rademacher

(10) Patent No.: US 6,570,918 B1
(45) Date of Patent: May 27, 2003

(54) RECEIVER AND METHOD FOR RECOVERING DATA FROM SPREAD SPECTRUM RADIO SIGNALS

(75) Inventor: Leo Rademacher, Holtzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/377,607

(22) Filed: Aug. 19, 1999

(30) Foreign Application Priority Data

Aug. 19, 1998 (DE) ..................................... 981 15 646.6

(51) Int. Cl.⁷ ................................................. H03H 7/30
(52) U.S. Cl. ....................................... 375/232; 375/147
(58) Field of Search ................................. 375/130, 137, 375/140, 147, 232, 326, 148, 150; 370/320, 335, 342, 441

(56) References Cited

U.S. PATENT DOCUMENTS

| | | | | |
|---|---|---|---|---|
| 5,572,552 A | * | 11/1996 | Dent et al. | 375/343 |
| 5,646,964 A | * | 7/1997 | Ushirokawa et al. | 375/346 |
| 5,719,899 A | * | 2/1998 | Thielecke et al. | 375/206 |
| 5,757,853 A | | 5/1998 | Tsujimoto | 375/200 |
| 5,937,014 A | * | 8/1999 | Pelin et al. | 375/340 |
| 6,047,023 A | * | 4/2000 | Arnstein | 375/229 |
| 6,175,588 B1 | * | 1/2001 | Visotsky et al. | 375/148 |

OTHER PUBLICATIONS

Patent Abstracts of Japan No. 03–283826 (Kazuhiro), dated Dec. 13, 1991.

* cited by examiner

Primary Examiner—Chi Pham
Assistant Examiner—Dung X. Nguyen
(74) Attorney, Agent, or Firm—Laurence A. Greenberg; Werner H. Stemer; Gregory L. Mayback

(57) ABSTRACT

A receiver for recovering data from received spread spectrum radio signals includes an equalizer, which mitigates at least some inter-symbol interference present in a sampled base band signal and which conditions the remaining inter-symbol interference such that the radio signals received via at least one propagation path are present in the conditioned remaining signals. The receiver also includes a symbol estimator coupled to the equalizer and configured to estimate the data by de-spreading the spread spectrum radio signals which correspond to the at least one propagation path with a corresponding spreading code. A communications system including the receiver for recovering data and a method of recovering data from spread spectrum signals are also provided.

15 Claims, 4 Drawing Sheets

RECEIVER AND METHOD FOR RECOVERING DATA FROM SPREAD SPECTRUM RADIO SIGNALS

BACKGROUND OF THE INVENTION

Field of the Invention

The invention relates to a receiver for recovering data from spread spectrum radio signals. The invention furthermore relates to a method for recovering data from spread spectrum radio signals.

Data is communicated using spread spectrum radio signals by combining the data with a spreading code which has an effect of increasing the bandwidth of the radio signals on to which the data and spreading code combination are modulated. Properties of the spreading code facilitate detection of the radio signals and recovery of the data at a receiver, despite the presence of contemporaneously detected like modulated spread spectrum radio signals generated by other transmitters. As a result, spread spectrum radio systems are used in mobile radio telephone systems to provide contemporaneous communication of data from a plurality of mobile stations. This is known as code division multiple access, and has been selected for both second and third generation mobile radio communication systems.

A characteristic of radio communications within a part of the radio frequency spectrum allocated to mobile radio communication systems, is that the radio signals propagate from transmitters to receivers via a plurality of paths. As a result, the radio signals detected by the receiver are superimposed. Where a temporal difference in the propagation time between at least two paths differs by more than a symbol period, inter-symbol interference results which must be mitigated in the receiver in order for data communicated by the radio signals to be recovered.

A known receiver which operates to recover data from received spread spectrum radio signals is known to those skilled in the art as a "rake" receiver. The rake receiver is known to be provided with a plurality of rake fingers. Each of the rake fingers is assigned on a pre-determined basis to one of a plurality of delays corresponding to the relative propagation delay experienced by the radio signals travelling via propagation paths along which the received radio signals may have traveled between the transmitter and the receiver. Thus the rake fingers are positioned in a temporal relationship with respect to each other and within each rake a cross-correlator is provided to cross-correlate the received radio signals with a locally generated version of the user specific spreading code. The cross-correlation after a symbol period, generated by each of the rake fingers, is thereafter combined in order to generate an estimate of the data symbols communicated by the radio signals.

A disadvantage of known rake receivers is that substantial parts of the energy of the radio signals may reach the receiver via paths which have a propagation delay corresponding to a relative temporal displacement falling between the temporal position of the fingers of the rake receiver. As such self-interference occurs within the rake receiver in that the energy corresponding to paths not in correspondence with the temporal position of the rake fingers causes interference with the correlation of the received radio signals within the rake fingers. Additionally each path received by a finger even produces self-interference to all other fingers. The self-interference is governed approximately by the auto-correlation function of segments of the spreading code.

Another known disadvantage of the rake receiver is caused by what is known as the "near/far" problem. The "near/far" problem is known to those skilled in the art as an effect whereby radio signals transmitted by a transmitter close to the receiver, having a relatively strong received signal strength, have an effect of suppressing radio signals transmitted by a transmitter further away, having a relatively weak signal strength. This has an effect of further exacerbating self-interference, especially where several paths of approximately the same amplitude which are not in synchronization with the corresponding temporal position of the rake fingers are present in the received signals.

A spread spectrum radio signal is generated by combining the data symbols to be communicated with a spreading code and modulating the resulting combination onto a radio frequency carrier signal. The spreading code typically comprises a plurality of symbols known as chips which are combined with the data by modulating the spreading code with the data in some way. Furthermore, in order to provide appropriate spectral shaping, the chips of the spreading code are combined with a modulation filter such as, for example, a root raised cosine filter. A root raised cosine modulation filter is well known to those skilled in the art. It is known that by passing the received signal through a receiver filter having a corresponding root raised cosine filter, a raised cosine pulse shape results, with the effect that if the signal is sampled at the symbol rate or in this case the chip rate, then no inter-symbol interference is present in the received signal samples. This applies, of course, only under the condition that there is no inter-symbol interference caused by the channel.

Multi-path propagation is a characteristic of radio communications in a frequency band used by mobile radio communication systems. As a consequence, inter-symbol interference resulting from the transmit and receive filters will be present at each of the correlators of the rake fingers as a result of paths causing self-interference. In other words, the self-interference problem has the further effect that the received chips are superimposed, causing residual inter-symbol interference in the received signal. In order to prevent non-linear distortions by aliasing when decimating the signal to the chip rate a very high initial sample rate is required so as to allow a fine time resolution of the decimation process. In order to effect this time resolution, the received signal must be oversampled at the chip rate. However, since the chip rate is already many times greater than the symbol rate, oversampling at the chip rate is undesirable.

SUMMARY OF THE INVENTION

It is accordingly an object of the invention to provide a receiver for recovering data from spread spectrum radio signals and a method for recovering data from spread spectrum radio signals which overcome the abovementioned disadvantages of the heretofore-known receivers and methods of this general type and which recover data from spread spectrum radio signals in which inter-symbol interference is substantially reduced, without requiring a sampling of the spread spectrum signal at a high rate.

With the foregoing and other objects in view there is provided, in accordance with the invention, a receiver for recovering data from spread spectrum signals, comprising:

an equalizer for filtering spread spectrum signals in accordance with an impulse response adapted to the spread spectrum signals and generating filtered signals, the equalizer mitigating at least a portion of an inter-symbol interference present in the spread spectrum signals; and a data symbol estimator connected to the equalizer for estimating data by de-spreading the filtered signals with a spreading code.

In accordance with another feature of the invention, a receiver controller includes a data processor for adapting a plurality of impulse response coefficients for an impulse response estimate of a communications channel through which the spread spectrum signals have passed, the data symbol estimator detects data symbols from the spreading code in combination with the impulse response estimate.

In accordance with yet another feature of the invention, the data symbol estimator is a rake detector having at least one rake finger for correlating the filtered signals with respect to the spreading code at a delay determined from the impulse response estimate at relative temporal displacements corresponding to at least one propagation path and scaled by at least one of the impulse response coefficients.

In accordance with a further feature of the invention, the spread spectrum signals include a given signal formed with a pilot spreading code, the rake detector includes a pilot rake for identifying the at least one propagation path by comparing the spread spectrum signals to the pilot spreading code, and upon identifying the at least one propagation path, allocating the at least one rake finger to the at least one propagation path.

In accordance with yet a further feature of the invention, a decimator is connected between the equalizer and the rake detector for decimating the filtered signals and forming decimated signals having one sample per chip.

With the object of the invention in view there is also provided a method for recovering data from spread spectrum signals, which comprises:

filtering spread spectrum signals in accordance with an impulse response adapted to the spread spectrum signals for generating filtered signals by equalizing the spread spectrum signals with an equalizer for mitigating at least a portion of an inter-symbol interference present in the spread spectrum signals; and detecting data from the filtered signals with a spreading code used for spreading a spectrum of the spread spectrum signals.

In accordance with another mode of the invention, the filtering step includes conditioning the spread spectrum signals such that a remaining part of the inter-symbol interference corresponds to at least one selected propagation path of the spread spectrum signals.

In accordance with another mode of the invention, the spread spectrum signals are sampled for generating sampled signals and the filtering step includes combining the sampled signals with a plurality of equalizer coefficients.

In accordance with another mode of the invention, an impulse response estimate of a channel through which the spread spectrum signals have passed is formed, and the filtered signals are de-spread with the spreading code and in accordance with components of the impulse response estimate, the spread spectrum signals have been generated with the spreading code.

In accordance with a further mode of the invention, the impulse response is scaled by at least one of a plurality of impulse response coefficients of the impulse response estimate, and the de-spreading step includes correlating the filtered signals in accordance with the spreading code at a delay determined from at least one component of the impulse response.

In accordance with yet a further mode of the invention, the impulse response coefficients are adapted with respect to time in accordance with a point in time at which data symbols are detected.

The invention is generally provided in a receiver having an adaptive pre-equalizer for pre-processing the received spread spectrum signal before it is further processed in a rake detector. The pre-equalizer reduces the amount of inter-symbol interference resulting from a number of strong propagation paths, to the effect that residual inter-symbol interference at the output of the pre-equalizer may be substantially mitigated by the rake detector, thereby facilitating detection and recovery of the data using the rake receiver. Any type of pre-equalizer such as a linear equalizer or a decision feedback equalizer may be used.

According to the invention there is provided a receiver for recovering data from received spread spectrum radio signals. The receiver includes a filter which operates to filter the received radio signals with respect to an impulse response adapted to the radio signals, and includes a symbol estimator coupled to the filter and configured to estimate the data by de-spreading the filtered radio signals with respect to a corresponding spreading code, wherein the filter (22, 24) is an equalizer (22), which operates to mitigate at least some inter-symbol interference present in the radio signals.

By providing a pre-equalizer before the rake detector, some and ideally all of the inter-symbol interference may be cancelled in the received spread spectrum radio signals, and any remaining inter-symbol interference cancelled by the rake detector.

The equalizer may operate to condition the remaining inter-symbol interference such that the remaining inter-symbol interference corresponds to paths at temporal positions corresponding to the temporal position of the rake fingers.

The equalizer may operate to convolve the received signals with a plurality of equalizer coefficients. The receiver may further include a data processor which operates to adapt the equalizer coefficients for minimizing an error signal derived from the received signals.

The receiver may be a linear equalizer or a decision feedback equalizer.

Linear equalizers and digital feedback equalizers are known to suffer error propagation and noise enhancement if configured to cancel all inter-symbol interference in a received signal. However the invention offers an advantage in that by only mitigating part of the inter-symbol interference in the received signal, the equalizer may operate according to a linear or a decision feedback equalizer whilst not incurring the disadvantage of noise enhancement or error propagation.

The equalizer offers a further advantage in that chip timing synchronization is substantially achieved by the equalizer which acts as an interpolation filter adjusting the delays for the subsequent rake detector. Furthermore, a synchronization may be achieved not only to the chip rate but also to the symbol rate, therefore obviating a requirement to acquire symbol synchronization after the received spread spectrum radio signals have been de-spread.

As will be appreciated, the invention can operate with an equalizer having fractionally spaced equalizer taps or T or chip spaced equalizer taps.

According to an aspect of the invention there is provided a method of recovering data from received spread spectrum radio signals. The method includes the steps of, filtering the spread spectrum radio signals with respect to an impulse response adapted to the spread spectrum radio signals, and detecting the data from the filtered signals in combination with a spreading code used to spread the spectrum of the radio signals, wherein the step of filtering the received radio signals, includes the step of equalizing the spread spectrum signals using an equalizer to the effect of mitigating at least some inter-symbol interference present in the signals.

Other features which are considered as characteristic for the invention are set forth in the appended claims.

Although the invention is illustrated and described herein as embodied in a receiver and a method for recovering data from received spread spectrum radio signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
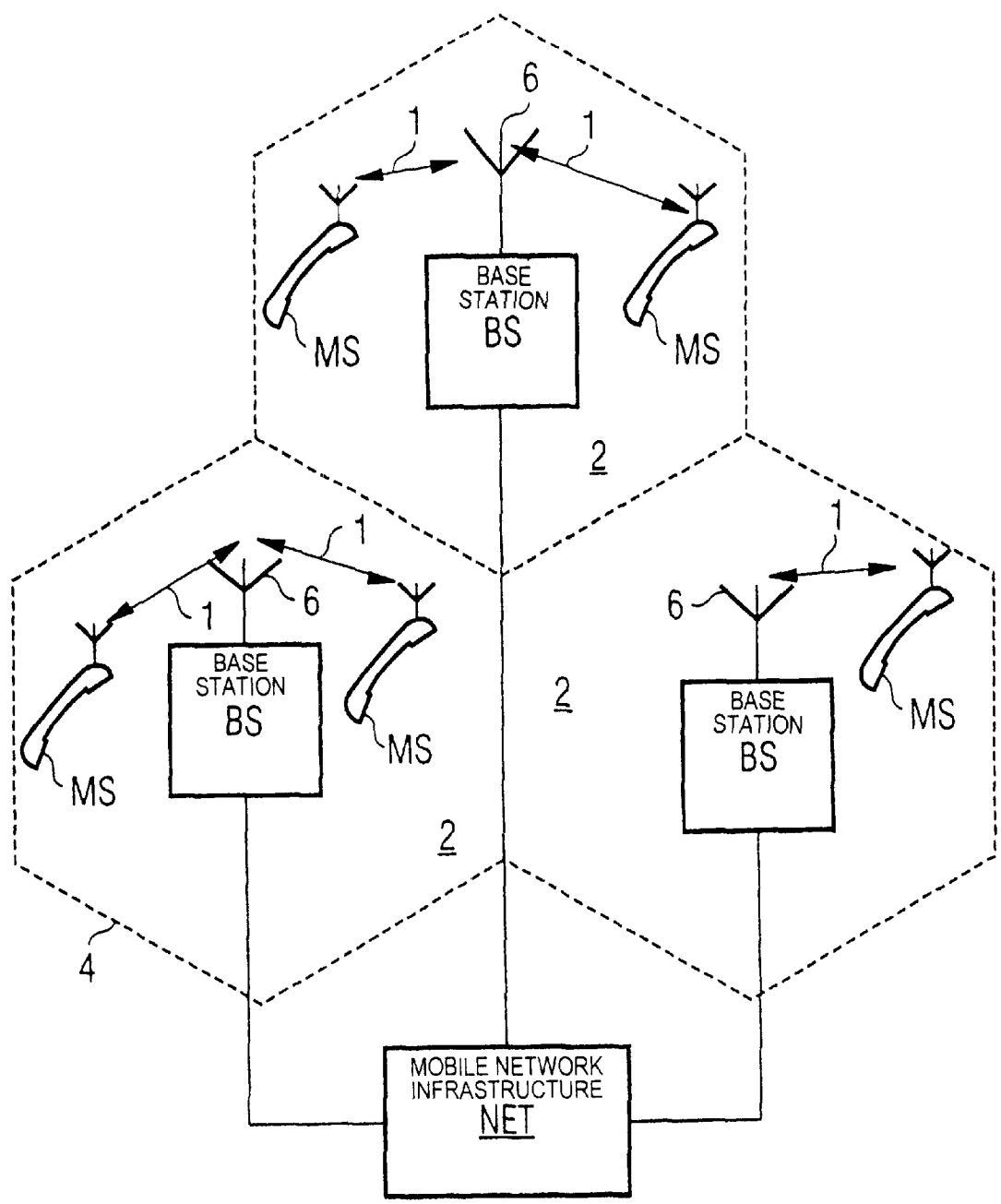
FIG. 1 is a schematic block diagram of a mobile radio telecommunication system.

An exemplary embodiment of the invention will be described with reference to the accompanying drawings wherein the exemplary embodiment of the invention will be illustrated with reference to a mobile radio telecommunication system and in particular to a mobile radio telecommunication system which operates in accordance with code division multiple access (CDMA). Referring now to the figures of the drawings in detail and first, particularly, to FIG. 1 thereof, there is shown an illustrative example of a mobile radio telecommunication system. In FIG. 1 a plurality of mobile stations MS, are shown to communicate using radio signals 1, transmitted between the mobile stations MS and a plurality of base stations BS. The base stations are disposed in a spaced apart relationship so as to provide a radio coverage area which may be viewed as being made up from a number of cells 2. A cell 2, is defined as a geographical area within which radio communications may be effected with a particular base station, as opposed to any of the other base stations in a mobile radio network. The cells 2, formed for each of the three base stations BS illustrated in FIG. 1, are defined by the broken line 4. The mobile stations communicate data with each of the base stations BS, using radio signals 1, which are detected by the receive antenna 6. The base stations BS of the mobile radio network are coupled together via a mobile network infra-structure shown generally as a unit NET.

A characteristic of CDMA radio access techniques is that mobile stations MS are configured to communicate radio signals contemporaneously to the base stations BS, which operate to recover the data symbols communicated by the mobile stations by correlating the received radio signals with respect to a user specific spreading code. Data is communicated between the base station BS and mobile stations MS by modulating the data with a user specific spreading code and then modulating the result onto a radio frequency carrier. At receivers in the respective base and mobile stations, the received radio signals are correlated with the user specific spreading sequence to the effect that the data symbols are recovered inspite of the presence of contemporaneously detected spread spectrum signals from other mobile and base stations as the case may be.

Figure 2:
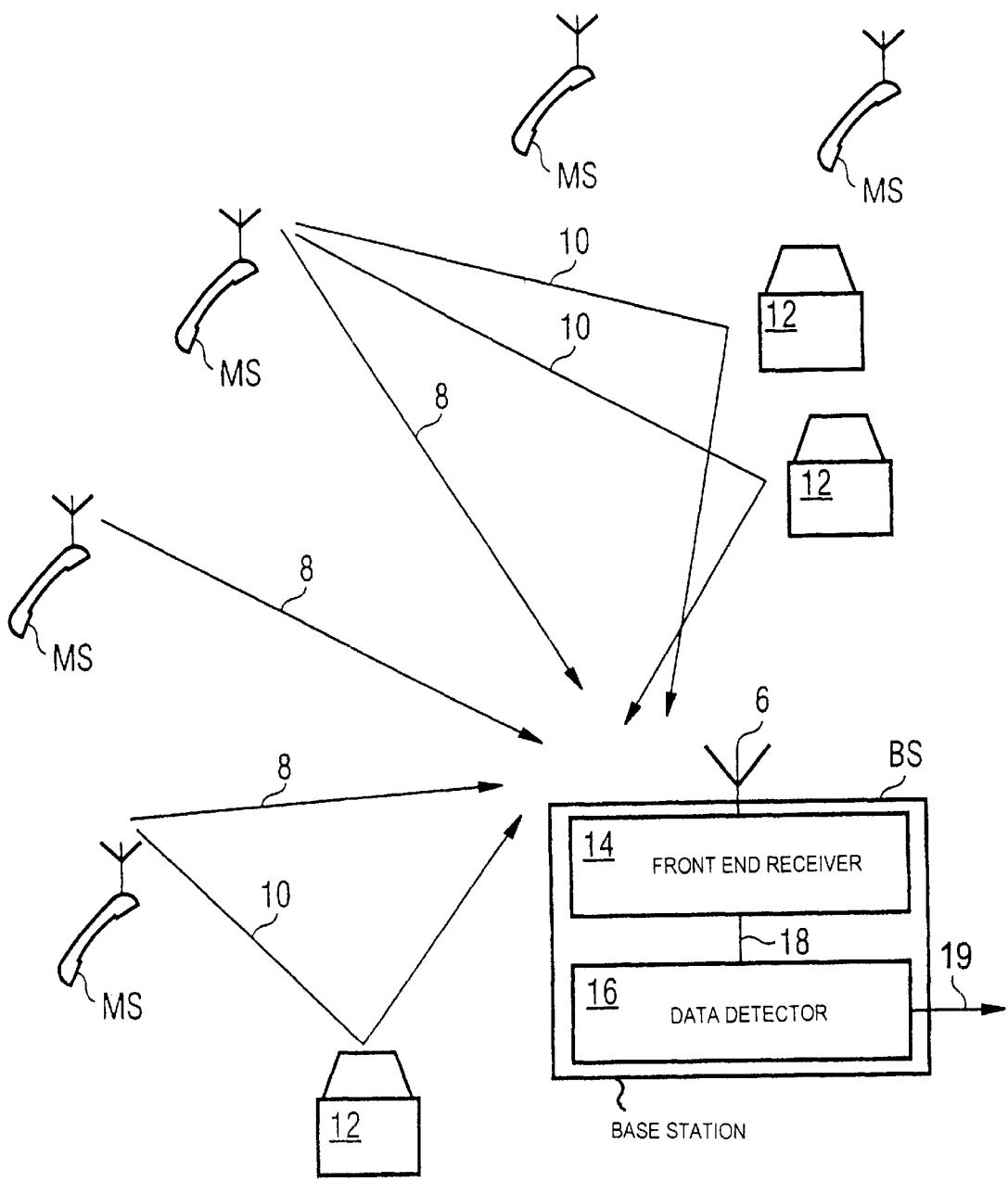
FIG. 2 is a schematic illustration of the propagation of radio signals from the mobile stations shown in FIG. 1 to one of the base stations shown in FIG. 1.

An illustration of the communication of CDMA signals between the mobile stations MS and one of the base stations BS shown in FIG. 1 is illustrated in FIG. 2 where parts also appearing in FIG. 1 have the same reference numerals. In FIG. 2, a plurality of mobile stations MS is shown to contemporaneously communicate radio signals with the base station BS. Multi-path propagation is illustrated in FIG. 2 by the lines 8, 10, which comprise direct paths 8 and indirect paths 10, which are often reflected at objects such as buildings 12. As a result of the multi-path propagation of the radio signals, the data communicated by the radio signals will exhibit inter-symbol interference in a case where a temporal difference for the time it takes for the radio signals to reach the base station BS via at least two different paths is greater than a symbol period. The base station BS must therefore be provided with tools to mitigate the effect of multi-path propagation.

As illustrated in FIG. 2 the base station BS detects the received radio signals using the receive antenna 6, and communicates the detected radio signals to the front-end receiver 14. The front-end receiver 14 operates to down-convert the received radio signals and feeds the base band analog signals to a data detector 16, via a conductor 18. The data detector 16 operates to recover the data communicated for at least one mobile station which is provided at an output conductor 19.

Figure 3:
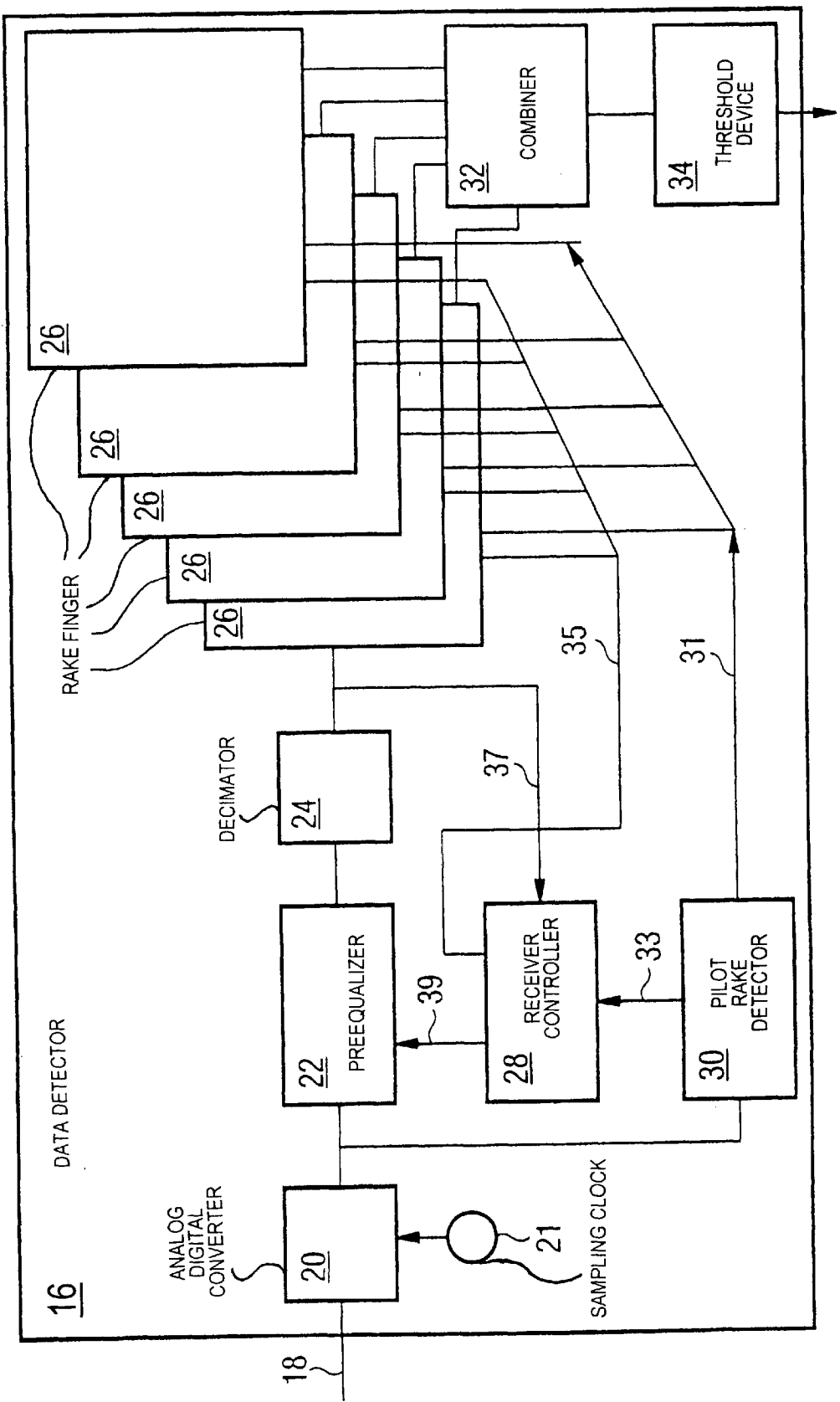
FIG. 3 is a schematic block diagram of a data detector for recovering data from received spread spectrum radio signals.

An example data detector 16 is illustrated in FIG. 3 where elements also shown in FIGS. 1 and 2 have the same reference numerals. In FIG. 3 the base band analog signal is fed via the conductor 18 to an analog-to-digital converter 20. The analog-to-digital converter 20 operates with a sampling clock 21 to sample the analog signal at twice the chip-rate of the received spread spectrum radio signal. Coupled to an output of the analog-to-digital converter 20 is a pre-equalizer 22, which in the exemplary embodiment is a linear equalizer and therefore operates to convolve the base band sampled signal with tap coefficients $\vec{w}$ of the equalizer. The pre-equalized signals resulting at an output of the pre-equalizer 22 are fed to a decimator 24, which thereafter feeds the chip rate signals to each of a plurality of rake fingers 26 forming a rake detector. Also coupled to the output of the analog-to-digital converter 20, is a pilot rake detector 30. The pilot rake detector 30 operates to correlate the received spread spectrum radio signals with reference to a pilot code which is locally generated within the pilot rake detector 30. The pilot rake detector 30 is configured to search the received radio signals for detecting the most significant paths present in the received radio signals. In correspondence with the most significant paths a corresponding delay signal is generated and output on a conductor 31 to each of the rake fingers 26. The same delays are also fed to the receiver controller 28 via a conductor 33. The receiver controller 28 operates to adapt the equalizer coefficients of the pre-equalizer 22 and the channel impulse response coefficients which are used in the rake fingers 26 and which are fed to the rake fingers via a conductor 35.

For each symbol period, each of the rake fingers operates to convolve a locally generated version of a spreading code used to spread the spectrum of the received radio signals with an impulse response of the communications channel.

That is to say the impulse response of the communications channel experienced by the received signals at the output of the pre-equalizer 22. The reference is time shifted according to the value communicated by the pilot rake via conductor 31, and then the time shifted reference correlated with respect to the received signals, integrated, and the integral then multiplied with the estimated tap coefficient communicated via the conductor 35, to generate an estimate of the data symbol for each rake finger. The estimated symbols are combined by a combiner 32 to generate an overall soft decision estimate of the detected data symbol which is fed to a threshold device 34, which operates to generate a hard decision of the data symbol or to slice the data symbol so as to provide the final estimate of the data symbol.

As will be appreciated by those skilled in the art the rake fingers 26, the rake pilot 30, the analog-to-digital converter 20, the combiner 32 and the slicer 34 substantially correspond to a conventional rake receiver. However the embodiment of the invention is characterized by the pre-equalizer 22, which in the present embodiment is a linear pre-equalizer which is adapted under the control of the receiver controller 28.

Figure 4:
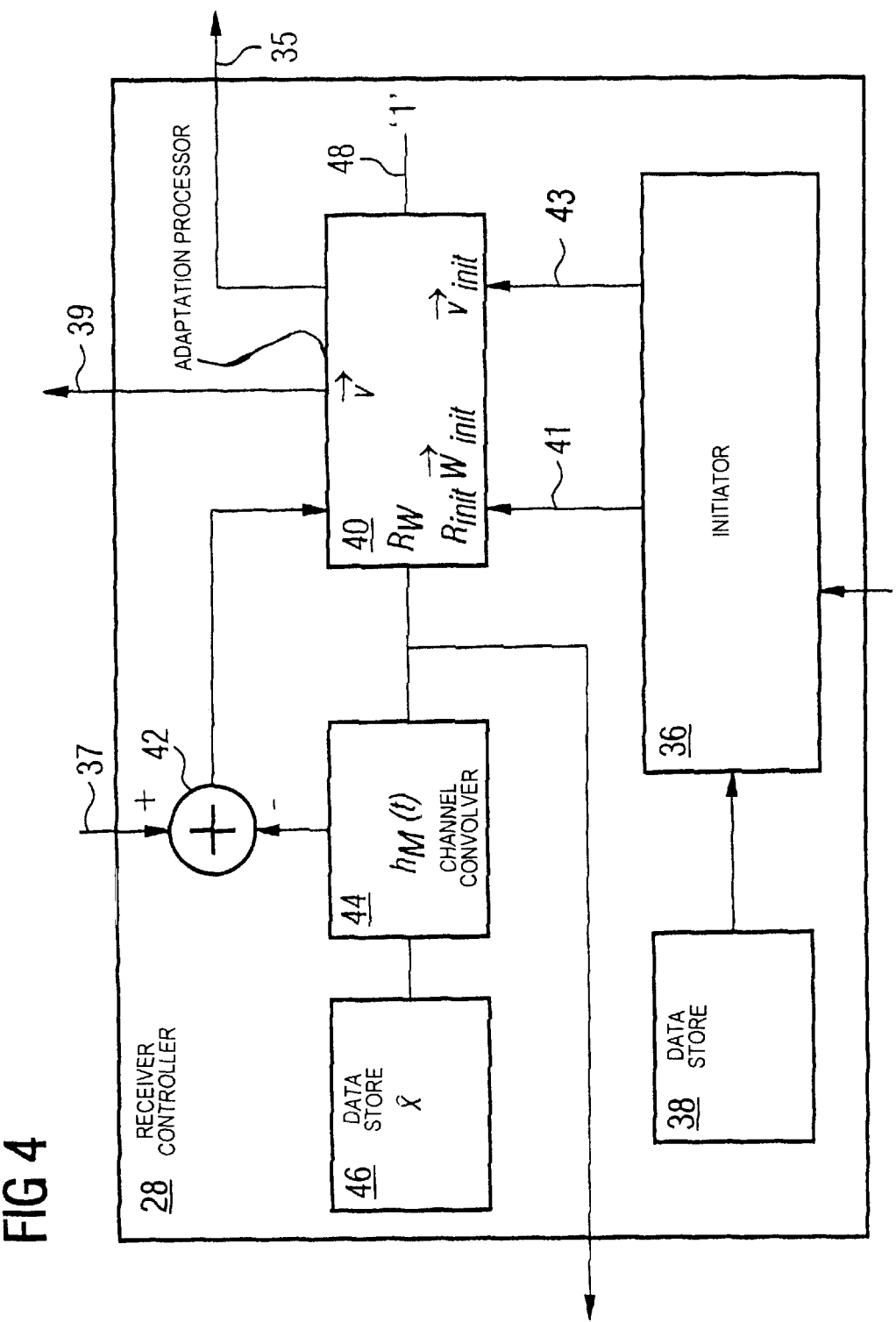
FIG. 4 is a schematic block diagram of the receiver controller shown in FIG. 3.

In order to facilitate an explanation of the operation of the data detector 16, a schematic block diagram of the receiver controller 28, is provided in more detail in FIG. 4 where parts also appearing in FIG. 3 have the same reference numerals. As shown in FIG. 3 the signal at the output of the pre-equalizer is fed back to the receiver controller 28, via a conductor 37 as is shown in FIG. 4.

The receiver controller 28, shown in FIG. 4 includes an initiator 36 fed with data from a data store 38. The initiator 36 provides initial estimates of the channel impulse response coefficients $\vec{w}_{init}$ and an initial estimate of the equalizer coefficients $\vec{v}_{init}$. These are fed to an adaptation processor 40 via two conductors 41, 43. The adaptation processor 40 operates to adapt the equalizer coefficients fed to the pre-equalizer via a conductor 39 and adapted channel impulse response coefficients fed to the respective rake finger via a conductor 35. The adaptation processor 40 operates to generate the pre-equalizer coefficients and the channel impulse response coefficients in accordance with an adaptation algorithm originally developed for adaptive antennas and disclosed in the co-pending UK patent application serial number GB 9804785.5 which is incorporated herein by reference. The adaptation processor calculates the update for the new pre-equalizer coefficients and the channel impulse response coefficients from an error signal e generated by an adder 42. The adder is supplied at its first input with the signal from the output of the pre-equalizer 22, via conductor 37, and at its second input with an output of a channel convolver 44. The channel convolver 44 operates to convolve the channel impulse response estimate provided by the adaptation processor 40 with reference signal data stored in an associated data store 46 and fed to the channel convolver 44. The error signal e is formed at an output of the adder 42 and is fed to the adaptation processor 40, which operates to calculate a new estimate for the equalizer coefficients and the adapted coefficients of the channel impulse response estimate.

An explanation of the operation of the data detector in combination with the receiver controller 28 will now be described with reference to the exemplary embodiment shown in FIGS. 3 and 4.

Generally, the adaptive pre-equalizer operates to reduce the number of strong paths of residual inter-symbol interference still present after the pre-equalizer output to a value that is within a range that is tolerable for the rake receiver. In effect the spread chip symbol stream is treated in the same way as an un-spread data symbol stream. Any type of pre-equalizer such as a linear equalizer (LE) or a decision-feedback equalizer (DFE) is appropriate. The adaptation processor 40 operates to adapt the equalizer coefficients and the channel impulse response coefficients during processing of a burst of radio signals. This adaptation process is relatively simple for a linear equalizer but is much more complicated for a decision feedback equalizer, where additional stability problems also arise. This is because in the case of the decision feedback equalizer, in order to enable a feedback decision to be made, an unreliable tentative chip symbol decision must be performed before the normal de-spreading to data symbols or even decoding to take place. This requires re-coding data symbols and re-spreading to regenerate chip symbols to be fed back so as to minimize error propagation. Error propagation of the insecure tentative decision within the decision feedback equalizer is more likely to lead to errors in the following rake finger correlators. The general principle is illustrated by the exemplary embodiment of the invention given in FIGS. 3 and 4, in which a linear fractional-spaced equalizer is used as the pre-equalizer 22. It is well known that a fractional-spaced equalizer is superior to a chip or T-spaced equalizer.

A particular advantage of the embodiment of the invention, is that a separate chip timing synchronization is not required because the linear equalizer also acts as an interpolation filter adjusting delays to facilitate detection of the data by the subsequent rake correlators. As such synchronization is achieved not only to the chip rate but also to the symbol rate without requiring any further symbol synchronization apparatus. However, some form of coarse chip rate synchronization is required to avoid sampling frequency drifts in case of a time-continuous transmission. In case of burst-wise transmission a coarse timing synchronization once per slot is sufficient.

The matched filter is a linear pre-equalizer applied to the received spread signal in order to generate the soft-decision chip symbol signal which ideally has no inter-symbol interference from the channel or the transmit and receiver filters. However, such a pure linear equalization can cause a drastic noise enhancement. Therefore, strong paths are not equalized but the associated inter-symbol interference remains after pre-equalization although inter-symbol interference as a result of transmit and receiver filters is substantially cancelled. Thus, the remaining inter-symbol interference is a series of dirac pulses temporally positioned at respective delays, which are estimated by the pilot rake 30. A maximum of N paths is not equalized if their power exceeds a certain proportion of the overall power. The delay resolution of the remaining paths is equal to the chip rate in consequence of decimation at the equalizer output, which is effected by the decimation filter 24. A model tap coefficient for every strong path is adapted together with the linear pre-equalizer coefficients. This process is described in the following paragraphs.

The adaptation processor 40 is used to track the channel coefficients and also used to track the pre-equalizer coefficients during each burst of radio signals. As an example the least mean squares algorithm is used although, as will be appreciated, this is only one example of a number of alternative ways of adapting the coefficients.

The task of adapting the equalizer coefficients is added to the task of adapting the channel model coefficients, which is effected by the adaptation processor 40. As the adaptive pre-equalizer can also correct time shifts, an additional interpolation or timing synchronization is not required.

The pre-equalizer coefficients are initialized to a value $\vec{v}_{init}$ by the initiator 36. This can be effected in various ways, such as, for example, by a least squares estimator based on the pilot data transmitted with the received radio signals. The channel impulse response is estimated by the initiator 36, and thus the model filter is initialized to a value $\vec{w}_{init}$, the estimated channel impulse response provided by a least squares estimator (also based on the pilot data) which is assigned to W whereas the new factor R is initialized by 1. The adaptation processor 40, operates in accordance with the process described with respect to adaptive antennas in the above referenced co-pending UK patent application GB 9804785.5. The process was originally developed for adaptive antennas, but is applied here to adaptive filtering or equalization. The pre-equalizer is also provided with an initial set of tap coefficients $\vec{v}_{init}$.

Introducing a vector to describe the time-shifted versions of the input signal g within the pre-equalizer 22, an error signal e generated by the adder 42, which is provided within the receiver controller 28, can be written as shown in equation (1):

$$e = \vec{g}\,\vec{v} - R\vec{W}\vec{x} \tag{1}$$

The adaptation process can be used for initialization by treating the (time-shifted) input signal vector like the (space diversity) input signal vector $\vec{g}$ and the pre-equalizer coefficient vector $\vec{v}$ like the antenna coefficient vector $\vec{a}$. The additional dimension of time delivers a matrix description as presented in equation (2):

$$\vec{e} = \vec{G}\,\vec{v} - \vec{X}\,\vec{w} \tag{2}$$

Generation of the initial set of equalizer and channel model coefficients is effected jointly by the initiator 36, and is configured to be substantially optimum. Again a description of this optimization process is provided in the copending patent UK application No. 9804785.5, although for adapting antenna coefficients as opposed to adapting the pre-equalizer coefficients as in the present case. The initialization is effected by jointly optimizing the pre-equalizer coefficients (instead of antenna coefficients) and the channel model coefficients using a pre-determined data sequence transmitted with the spread spectrum radio signals, which are known to the receiver. The pre-determined data sequence is contained in the data store 38 and is fed to the initiator 36, as shown in FIG. 4. The generation of optimum values of the pre-equalizer and channel model coefficients is furthermore effected under the condition that the first channel model tap has a value of unity. This is effected by the constant '1' shown in FIG. 4, as applied to input conductor 48 of the adaptation calculator 40.

The ideal condition for optimum adaptation that can only be fulfilled approximately is given by the matrix equation (3):

$$[\vec{G} - \vec{X}] \begin{bmatrix} \vec{v} \\ \vec{w} \end{bmatrix} = 0 \tag{3}$$

Equation (3) can be rewritten by separating the first column $\vec{x}_0$ of $\vec{X}$ from the remainder $\vec{X}_s$ and the first tap $w_0$ from the remainder $\vec{w}_s$ as expressed in equation (4):

$$[\vec{G} - \vec{x}_0 - \vec{X}_S] \begin{bmatrix} \vec{v} \\ w_0 \\ \vec{w}_S \end{bmatrix} = 0 \tag{4}$$

Transferring the middle term in the matrix product to the right-hand side and obeying the constraint $w_0 = 1$, delivers an optimization equation (5):

$$[\vec{G} - \vec{X}_S] \begin{bmatrix} \vec{v} \\ \vec{w}_S \end{bmatrix} = \vec{x}_0 \tag{5}$$

Equation (5) has a solution given by equation (6):

$$\begin{bmatrix} \vec{v} \\ \vec{w}_S \end{bmatrix} = [\vec{G} - \vec{X}_S]^+ \vec{x}_0 \tag{6}$$

Here the operator + denotes the Moore-Penrose-inverse, $\vec{w}_S$ the shortened model tap weight vector without the first tap, $\vec{X}_S$ the shortened symbol matrix which is the remainder of the matrix $\vec{X}$ after the removal of the first column $\vec{x}_0$. Finally, the pre-equalizer and channel coefficients must be scaled according to different constraints, to the effect that for example $|\vec{w}|^2 = 1$ for the adaptation algorithm instead of the constraint $w_0 = 1$.

Synchronization to the chips of the radio signal is determined by the initiator 36, using the pilot rake detector 30. Coarse timing synchronization provided by the pilot rake detector 30, can be followed by a fine timing synchronization by repeating the procedure for several timings close to the coarse timing already obtained from the pilot rake. Fine timing synchronization in this way delivers the pre-equalizer and channel model coefficients required for initialization. Convergence properties are not as important since the adaptation is used for tracking only. As will be appreciated, simpler timing synchronization strategies are to be applied, and synchronization from scratch can be considered.

The adaptation process which uses a common factor for all tap weights replaces the tap coefficients w by a product RW and introduces a penalty term to control the amplitude of R. The new version with common factor R is derived from the adaptation in accordance with a principle of deepest decent for a special case of the known (leaky) Least Mean Squares (LMS) algorithm. The example adaptation algorithm introduced here is an add-on to the (leaky) LMS algorithm with a common factor for all tap weights. Once more, the channel tap coefficients w are split into the product of the factors R (rotator, describing a common variation of all taps) and W (multiplicative offset describing individual tap variations).

For the derivation the extended tap vector is augmented by the additional component $\vec{v}$ and a penalty term is introduced into the cost function to keep the amplitudes of R and $\vec{W}$ close to 1. Re-deriving using the original LMS algorithm will then yield the new version with common factor R and in addition the pre-equalizer coefficient adaptation. In the following this is shown for the LMS as an example that is derived from the principle of steepest descent.

Both the pre-equalizer and channel impulse response coefficients are incremented from previous estimates by certain amounts determined by the error signal e, the symbol vector $\vec{x}$ and the adaptation step size $\mu$ according to the well-known LMS algorithm. For improved adaptation the tap coefficient vector $\vec{w}$ is represented as the product of a scalar factor R and a multiplicative offset vector $\vec{W}$. By straightforwardly re-deriving the LMS equation from the principle of steepest descent and replacing the tap coefficient vector $\vec{w}$ by the product $R\vec{W}$ and using an extended tap vector, according to equation (b 7), delivers the LMS equations for pre-equalizer and channel coefficient estimation, bearing in mind that t denotes the time sample and $\vec{x}$ the hard decision vector.

$$\vec{w}_E = \begin{bmatrix} \vec{v} \\ \vec{W} \\ R \end{bmatrix} \quad (7)$$

Separate step sizes are also introduced for all taps in order to allow the adaptation to be slowed down or deactivated for weaker taps. With the operator · denoting element-by-element multiplication, therefore, the well-known leaky LMS equation with a leakage factor $L = L_R L_W$, with for example $L_R = L_W = 1 - 1$ least significant bit, for improved stability and to assure desired constraints, adaptation of the channel impulse response coefficients is expressed as given in equation (8):

$$\vec{w}_t = L \vec{w}_{t-1} + \mu e_{t-1} \vec{x}_{t-1} \quad (8)$$

Applying this to the adaptation of the pre-equalizer coefficients, leads to equation (9), equation (10) for the individual multiplicative tap offsets, and equation (11) for the taps rotator with a scalar product:

$$\vec{v} = \vec{L}_v \cdot \vec{v} - \vec{\mu}_v \cdot e \vec{g}^* \quad (9)$$

$$\vec{W}_t = L_W \vec{W}_{t-1} + \vec{\mu} \cdot e_{t-1} R_{t-1} \vec{x}_{t-1} \quad (10)$$

$$R_t = L_R R_{t-1} + \mu_R e_{t-1} \vec{W}_{t-1} \cdot \vec{x}_{t-1} \quad (11)$$

If a penalty term is introduced to keep the absolute values of R and $\vec{W}$ close to 1, equation (11) must be modified slightly by changing the normal value $L_R$ (for the "normal" case that the absolute value is above 1) to $2-L_R$ and likewise the normal value $\vec{L}_W$ (for the "normal" case that the absolute value is above 1) to $2-\vec{L}_W$, if the respective absolute value is below 1. Alternatively, a penalty term can be used to keep the absolute values of R and $\vec{v}$ close to 1. The rotator update equation must then be modified slightly by changing $L_R$ to $2-L_R$ and $\vec{L}_v$ to $2-\vec{L}_v$ if the respective absolute value is below 1. In the latter case the absolute value of the pre-equalizer tap weight vector is constrained rather than the absolute value of the model tap weight vector.

The algorithm can be configured by the following parameters: Adaptation step sizes (known from LMS theory): $\vec{\mu}_v$ controls the estimation of the pre-equalizer coefficients $\vec{v}$, $\mu_R$ the estimation of R and $\vec{\mu}$ the estimation of (the vector) $\vec{W}$. The parameters can be configured individually from outside on a call-by-call basis for maximum flexibility.

The leakage factors $\vec{L}_v$, $\vec{L}_W$ and $L_R$ can be switched off, if desired for faster tracking at the expense of a stability reduction and constraint violation which, however, should pose no problem for signals with short bursts.

During the training sequence known training symbols are used for adaptation instead of the detected symbols allowing a fast adaptation from scratch within, for example, sixteen symbols. During the data sequence the adaptation must be slowed down to a reasonable degree in the case of very fast adaptation from scratch.

1) Deactivated adaptation: $\vec{\mu}_v = 0$, $\vec{\mu} = 0$, $\mu_R = 0$

The pre-equalizer coefficients remain unchanged during each burst and the equalizer performs like an ordinary non-adaptive equalizer. This is achieved by switching off both the leakage and the update of the pre-equalizer and channel coefficients. If this mode is also chosen during training with the mid-amble, the tap coefficients must be provided by the initial value estimator in this special case.

2) Traditional LMS operation mode for channel coefficients only: $\vec{\mu}_v = 0$, $\vec{\mu} = 2^{-5}$, $\mu_R = 0$ The pre-equalizer coefficients remain unchanged during each burst of radio signals and the overall channel coefficients used in the rake for maximum ratio combining of paths are estimated according to the traditional LMS adaptation. This mode is well-known from theory, including the disturbing effects, convergence, and stability. In order to allow all taps to follow the rapid changes, all step sizes have to be set rather high so that noise amplification becomes visible. Faster adaptation is possible but at the expense of large noise amplification. From the theory of the LMS algorithm it is well known that step sizes larger than the reciprocal of the number of taps (i.e number of channel coefficients) lead to instabilities.

3) Traditional LMS operation mode for pre-equalizer only: $\vec{\mu}_v = 2^{-5}$, $\vec{\mu} = 0$, $\mu_R = 0$ The channel model coefficients remain unchanged during each burst of radio signals and the pre-equalizer coefficients are adapted according to the traditional LMS algorithm. In order to allow all the pre-equalizer coefficients to follow rapid changes, all step sizes have to be set rather high so that noise amplification becomes visible. Faster adaptation is possible but at the expense of large noise amplification.

From the theory of the LMS algorithm it is well known that step sizes larger than the reciprocal of the number of taps (i.e. number of pre-equalizer coefficients) lead to instabilities.

4) Traditional LMS operation mode: $\vec{\mu}_v = 2^{-6}$, $\vec{\mu} = 2^{-6}$, $\mu_R = 0$ Both the pre-equalizer and the channel model coefficients are adapted according to the traditional LMS algorithm. As a first guess it is envisaged that, for example, doubling the number of coefficients to be adapted by additional adaptation of the pre-equalizer coefficients the adaptation step sizes must be halved for similar stability and noise amplification. In order to allow all taps to follow rapid changes all step sizes have to be set rather high so that noise amplification becomes visible.

5) Normal operation mode: $\vec{\mu}_v = 2^{-5}$, $\vec{\mu} = 2^{-6}$, $\mu_R = 2^{-3}$ The rotator R takes advantage of the fact that a considerable amount of tap variations is common to all taps which may be due to down link effects leading to a carrier frequency error and due to the absence of explicit carrier recovery. If the rotator adapts fast enough, the individual taps can be adapted slower than in the case of traditional LMS adaptation without a rotator. Without pre-equalizer coefficient adaptation the rotator contributes to the noise amplification with roughly the same amount as each individual tap on its own. Use of the rotator allows a reduction in all individual step sizes so that the effect of noise amplification is reduced drastically. In consequence, no significant increase in error rates after the channel decoder arises even for poor signal-to-noise ratios. Extrapolating these results to the case with pre-equalizer coefficient adaptation, the old adaptation step sizes for the individual taps are halved to allow the original value for the adaptation step size of the pre-equalizer coefficients.

6) Fast operation mode: $\vec{\mu}_v = 2^{-4}$, $\vec{\mu} = 2^{-5}$, $\mu_R = 2^{-2}$ Although error rates increase noticeable for stationary channels, fast variations are tracked better than in the normal operation mode. Obviously, the signal-to-noise ratio or carrier-to-interference ratio performance is slightly degraded.

7) Very Fast operation mode: $\vec{\mu}_v = 2^{-3}$, $\vec{\mu} = 2^{-4}$, $\mu_R = 2^{-1}$ The operation range approaches the edge of stability and performance degradation therefore becomes significant for channels that do not vary very fast. Yet, even very fast variations can be tracked at the expense of significantly worsened signal-to-noise ratio or carrier-to-interference ratio performance.

8) Pre-equalizer Element or Tap Switch-Off mode: $\vec{\mu}_v = 2^{-3}$, $\vec{\mu} = 0$, $\mu_R = 2^{-2}$ If desired the adaptation can be switched-off for some model or pre-equalizer taps so as to allow faster adaptation of the remaining taps with constant signal-to-noise ratio or carrier-to-interference ratio performance. This is achieved by the separate configuration of all adaptation step sizes for each tap. The adaptation of missing pre-equalizer elements should be switched off to avoid unnecessary noise amplification. Obviously, this special case mode relies on the individual surroundings of the base station for switching off channel taps. The taps can be switched on a call-by-call basis if desired.

9) Rotator Mode: $\vec{\mu}_v = 2^{-3}$, $\vec{\mu} = 0$, $\mu_R = 2^{-2}$

If desired the individual adaptation of tap coefficient offsets can be switched off so as to allow faster adaptation of the rotator and the pre-equalizer coefficients with constant signal-to-noise ratio or carrier-to-interference ratio performance. Obviously, this special case mode relies on the individual surroundings of the base station. Specifically, a single dominating path (that may be accomplished by directional pre-equalizers) will make multi-path propagation negligible and allow parallel adaptation of all taps.

As will be appreciated by those skilled in the art, various modifications may be made to the embodiment described above without departing from the scope of the invention. In particular various techniques for adapting the coefficients of the pre-equalizer can be used and various types of equalizers such as a linear equalizers, decision feedback equalizers or maximum likelihood type equalizers can be used as a pre-equalizer for the rake fingers. Furthermore the invention can be applied in both, Wide Band CDMA and Time Division CDMA as well as in other modulation schemes.

I claim:

1. A receiver for recovering data from spread spectrum signals, comprising:
    an equalizer for filtering spread spectrum signals in accordance with an impulse response adapted to the spread spectrum signals and generating filtered signals, said equalizer mitigating at least a portion of an inter-symbol interference of the spread spectrum signals, and said equalizer conditioning the inter-symbol interference causing a remaining part of the inter-symbol interference to correspond to at least one propagation path of the spread spectrum signals; and
    a data symbol estimator connected to said equalizer for estimating data by de-spreading the filtered signals with a spreading code.

2. The receiver according to claim 1, wherein said equalizer convolves the spread spectrum signals with a plurality of equalizer coefficients.

3. The receiver according to claim 2, including a receiver controller connected to said equalizer for adapting a plurality of equalizer coefficients in accordance with an error signal derived from the spread spectrum signals.

4. The receiver according to claim 3, wherein said receiver controller includes a data processor for adapting a plurality of impulse response coefficients for an impulse response estimate of a communications channel through which the spread spectrum signals have passed, said data symbol estimator detects data symbols from the spreading code in combination with the impulse response estimate.

5. The receiver according to claim 4, wherein said data symbol estimator is a rake detector having at least one rake finger for correlating the filtered signals with respect to the spreading code at a delay determined from the impulse response estimate at relative temporal displacements corresponding to at least one propagation path and scaled by at least one of the impulse response coefficients.

6. The receiver according to claim 5, wherein the spread spectrum signals include a given signal formed with a pilot spreading code, said rake detector includes a pilot rake for identifying the at least one propagation path by comparing the spread spectrum signals to the pilot spreading code, and upon identifying the at least one propagation path, allocating said at least one rake finger to the at least one propagation path.

7. The receiver according to claim 1, wherein said equalizer is one of a linear equalizer and a decision feedback equalizer.

8. The receiver according to claim 5, including a decimator connected between said equalizer and said rake detector for decimating the filtered signals and forming decimated signals having one sample per chip.

9. A method for recovering data from spread spectrum signals, which comprises:
    filtering spread spectrum signals in accordance with an impulse response adapted to the spread spectrum signals for generating filtered signals by equalizing the spread spectrum signals with an equalizer for mitigating at least a portion of an inter-symbol interference of the spread spectrum signals, and conditioning the spread spectrum signals so as to cause a remaining part of the inter-symbol interference to correspond to at least one propagation path of the spread spectrum signals; and
    detecting data from the filtered signals with a spreading code used for spreading a spectrum of the spread spectrum signals.

10. The method according to claim 9, which comprises sampling the spread spectrum signals for generating sampled signals and wherein the filtering step includes combining the sampled signals with a plurality of equalizer coefficients.

11. The method according to claim 10, which comprises:
    determining an error signal from the filtered signals; and
    adapting the plurality of equalizer coefficients for minimizing the error signal.

12. The method according to claim 9, wherein the step of detecting data from the filtered signals includes:
    forming an impulse response estimate of a channel through which the spread spectrum signals have passed; and de-spreading the filtered signals with the spreading code and in accordance with components of the impulse response estimate, the spread spectrum signals generated with the spreading code.

13. The method according to claim 12, which comprises scaling the impulse response by at least one of a plurality of impulse response coefficients of the impulse response estimate, and wherein the de-spreading step includes correlating the filtered signals in accordance with the spreading code at a delay determined from at least one component of the impulse response.

14. The method according to claim 13, which comprises adapting the impulse response coefficients with respect to time in accordance with a point in time at which data symbols are detected.

15. A communications apparatus, comprising:

a receiver having an equalizer for filtering spread spectrum signals in accordance with an impulse response adapted to the spread spectrum signals and generating filtered signals, said equalizer mitigating at least a portion of an inter-symbol interference of the spread spectrum signals, said equalizer conditioning the inter-symbol interference causing a remaining part of the inter-symbol interference to correspond to at least one propagation path of the spread spectrum signals; and a data symbol estimator connected to said equalizer for estimating data by de-spreading the filtered signals with a spreading code.

* * * * *

UNITED STATES PATENT AND TRADEMARK OFFICE
CERTIFICATE OF CORRECTION

PATENT NO.    : 6,570,918 B1                                              Page 1 of 1
DATED         : May 27, 2003
INVENTOR(S)   : Leo Rademacher It is certified that error appears in the above-identified patent and that said Letters Patent is hereby corrected as shown below:

<u>Title page,</u>
Item [30], Foreign Application Priority Data, should read as follows:

-- Aug. 19, 1998         (EP)              .................. 981 15 646 --

Signed and Sealed this

Ninth Day of September, 2003

JAMES E. ROGAN
*Director of the United States Patent and Trademark Office*